(12) United States Patent
Thorsell et al.

(10) Patent No.: US 8,624,547 B2
(45) Date of Patent: Jan. 7, 2014

(54) RECHARGING OR CONNECTION TRAY FOR PORTABLE ELECTRONIC DEVICES

(75) Inventors: Roy Thorsell, Clawson, MI (US);
Thomas A. Miller, Royal Oak, MI (US)

(73) Assignee: Toyoda Gosei Co, Ltd, Haruhi-Nishinomachi (JP)

( * ) Notice: Subject to any disclaimer, the term of this patent is extended or adjusted under 35 U.S.C. 154(b) by 310 days.

(21) Appl. No.: 12/970,205

(22) Filed: Dec. 16, 2010

(65) Prior Publication Data

US 2011/0156637 A1 Jun. 30, 2011

Related U.S. Application Data

(60) Provisional application No. 61/290,348, filed on Dec. 28, 2009, provisional application No. 61/290,352, filed on Dec. 28, 2009, provisional application No. 61/326,893, filed on Apr. 22, 2010.

(51) Int. Cl.
*H02J 7/00* (2006.01)

(52) U.S. Cl.
USPC ............ 320/108; 320/107; 320/113; 320/115

(58) Field of Classification Search
USPC .................................. 320/108, 107, 113, 115
See application file for complete search history.

(56) References Cited

U.S. PATENT DOCUMENTS

| | | | |
|---|---|---|---|
| 5,992,807 A | 11/1999 | Tarulli | |
| 6,129,400 A | 10/2000 | Jakubiec et al. | |
| 6,149,116 A | 11/2000 | Won | |
| 6,155,525 A | 12/2000 | Joanisse | |
| 6,203,088 B1 | 3/2001 | Fernandez | |
| 6,761,388 B2 | 7/2004 | Lein et al. | |
| 6,888,940 B1 | 5/2005 | Deppen | |
| 7,111,883 B1 | 9/2006 | Patel et al. | |

(Continued)

FOREIGN PATENT DOCUMENTS

| | | |
|---|---|---|
| DE | 10062163 | 6/2002 |
| EP | 2043226 | 4/2009 |

(Continued)

OTHER PUBLICATIONS

Search Report for PCT/US2010/06,074,879 dated Dec. 16, 2010.

*Primary Examiner* — M'Baye Diao
(74) *Attorney, Agent, or Firm* — The Dobrusin Law Firm

(57) ABSTRACT

The present invention relates to a tray comprising: a) a base panel having two opposite edges adapted for sliding within grooves of a structure; b) a pair of electrical contacts located on the two opposite edges of the base adapted to conduct electricity; c) a battery recharging system adapted to provide one or more electromagnetic fields capable of transferring an electrical charge to a properly equipped electrical device having a rechargeable battery or a connection for a portable electronic device adapted to connect the portable electronic device to the power system of a host and/or other electronic systems of the host; d) means for connecting the pair of electrical contacts to the battery recharging system or to the connection to the portable electronic device; e) one or more display panels providing a surface for resting one or more rechargeable portable electric devices upon, such panels adapted to allow one or more users of portable electronic device to view one or more displays of the portable electronic devices; f) panels for connecting the base panel and one or more display panels and for enclosing the tray. The tray is adapted for use in a host system which supplies power to the tray. In a preferred embodiment, the host system is or is utilized in a vehicle.

19 Claims, 5 Drawing Sheets

(56) References Cited

U.S. PATENT DOCUMENTS

| | | |
|---|---|---|
| 7,147,259 B2 | 12/2006 | Radu et al. |
| 7,211,986 B1 | 5/2007 | Flowerdew et al. |
| 7,413,229 B2 | 8/2008 | Kukucka et al. |
| 7,429,068 B2 | 9/2008 | Busha et al. |
| 7,772,802 B2 | 8/2010 | Manico et al. |
| 7,812,771 B2 | 10/2010 | Greene et al. |
| 2001/0009057 A1 | 7/2001 | Schlatter et al. |
| 2003/0047955 A1 | 3/2003 | Bruhnke et al. |
| 2004/0204074 A1 | 10/2004 | Desai |
| 2006/0113810 A1 | 6/2006 | Kuhl |
| 2007/0035917 A1 | 2/2007 | Hotelling |
| 2007/0182367 A1 | 8/2007 | Partovi |
| 2007/0279002 A1 | 12/2007 | Partovi |
| 2007/0290645 A1 | 12/2007 | Boyadjieff et al. |
| 2008/0001572 A9 | 1/2008 | Baarman et al. |
| 2008/0122297 A1 | 5/2008 | Arai |
| 2008/0169910 A1 | 7/2008 | Greene et al. |
| 2008/0211320 A1 | 9/2008 | Cook et al. |
| 2008/0224655 A1 | 9/2008 | Tilley et al. |
| 2009/0033564 A1 | 2/2009 | Cook et al. |
| 2009/0045772 A1 | 2/2009 | Cook et al. |
| 2009/0072784 A1 | 3/2009 | Erickson |
| 2009/0102296 A1 | 4/2009 | Greene et al. |
| 2009/0106567 A1 | 4/2009 | Baarman |
| 2009/0153098 A1 | 6/2009 | Toya |
| 2009/0212637 A1 | 8/2009 | Baarman |
| 2009/0212638 A1 | 8/2009 | Johnson |
| 2009/0212639 A1 | 8/2009 | Johnson |
| 2010/0109445 A1 | 5/2010 | Kurs et al. |
| 2010/0156343 A1 | 6/2010 | Jung |
| 2010/0201189 A1 | 8/2010 | Kirby et al. |
| 2010/0201201 A1 | 8/2010 | Mobarhan et al. |
| 2010/0219183 A1 | 9/2010 | Azancot et al. |
| 2010/0219694 A1 | 9/2010 | Kurs et al. |
| 2010/0219697 A1 | 9/2010 | Azancot et al. |
| 2010/0244584 A1 | 9/2010 | Azancot et al. |
| 2010/0253283 A1 | 10/2010 | Francois |
| 2010/0259401 A1 | 10/2010 | Azancot et al. |
| 2010/0264747 A1 | 10/2010 | Hall et al. |
| 2010/0264871 A1 | 10/2010 | Matouka et al. |
| 2010/0277121 A1 | 11/2010 | Hall et al. |

FOREIGN PATENT DOCUMENTS

| | | |
|---|---|---|
| FR | 2833221 | 6/2003 |
| FR | 2907065 | 4/2008 |
| GB | 2416633 | 2/2006 |
| GB | 2453110 | 4/2009 |
| WO | 02/085672 | 10/2002 |
| WO | 2009/012033 | 1/2009 |
| WO | 2009/040807 | 4/2009 |

RECHARGING OR CONNECTION TRAY FOR PORTABLE ELECTRONIC DEVICES

CROSS REFERENCE TO RELATED APPLICATIONS

This application claims priority from U.S. Provisional Application Ser. No. 61/290,348 filed Dec. 28, 2009 titled "Movable Magnet and Panel Assembly"; from U.S. Provisional Application Ser. No. 61/290,352 filed Dec. 28, 2009 titled "Recharging or Connection Tray For Portable Electronic Devices" and from U.S. Provisional Application Ser. No. 61/326,893 filed Apr. 22, 2010 titled "Recharging or Connection Tray For Portable Electronic Devices", all incorporated herein by reference.

FIELD OF THE INVENTION

The present invention relates generally to a recharging or connection tray for portable electronic devices and to assemblies containing such trays. The trays and assemblies are especially useful in vehicles.

BACKGROUND OF THE INVENTION

Portable electronic devices are common place and many people carry one or more. Portable electronic devices require recharging and often need to be placed in communication with another, system which uses and/or generates information. In order to recharge or allow a portable electronic device to communicate with other information generating or using systems, direct connections utilizing one or more specially designed cords may be generally required. Each device uses a different cord and may use different cords for recharging and for communicating with information using or generating systems. In many locations, such as a vehicle, the presence of the cords is unsightly and may cause safety problems, because the cords can interfere with the function of other devices or controls of the host. Portable electronic devices also have connections for direct connection to other information using or generating systems and each portable device generally has a unique connection system. Recently, systems for wirelessly charging the batteries of portable electric devices have become available. Such systems utilize a device which generates an electromagnetic field. The portable electronic device requires a device which when located in close proximity to the electromagnetic field can transform the energy of the electromagnetic field into a charge to recharge the battery of the portable electronic device. Examples of such systems are disclosed in Baarman et. al. US Patent Publication 2008/0001572; Baarman et. al US Patent Publication 2009/0212637; Baarman et. al. US 2009/0106567; Arai US Patent Publication 2008/0122297; and Azancot et. al. WO 2009/040807 all incorporated herein by reference.

The problems presented to the user of portable electronic devices in a host system, such as a vehicle, are many. One problem is the need to recharge portable electronic devices using unique cords for each device. Another problem is that such devices have unique direct connection systems which prevent the use of a universal connection system in a host system. Another problem is the need for one or more cords which can be strung in inconvenient places or can present safety problems due to their location, for instance in or around vehicle shift controls or other vehicle controls. Another problem associated with the use of portable electronic devices is the need for the user to view one or more displays associated with the portable electronic devices and the lack of a place for locating the portable electronic devices to facilitate easy viewing of the displays, for instance in a vehicle.

What is needed is a system which allows a portable electronic device to be charged and/or connected to a hosts power system or information use or generation system without the need for a separate power cord. What is further needed is such a system which allows a user to easily view a display on the portable electronic device.

SUMMARY OF THE INVENTION

The present invention meets one or more of the above needs and is a tray comprising: a) base panel having two opposite edges adapted for sliding within grooves of a structure; b) a one or more contacts adapted to transfer data and/or electricity; c) a battery recharging system adapted to provide one or more electromagnetic fields capable of transferring an electrical charge to a properly equipped electrical device having a rechargeable battery or a connection for a portable electronic device adapted to connect the portable electronic device to the power system of a host and/or other electronic systems of the host; d) means for connecting the contacts to the battery recharging system and/or to the connection to the portable electronic device; e) one or more display panels providing a surface for resting one or more rechargeable portable electric devices upon, such panels adapted to allow one or more users of portable electronic devices to view one or more displays of the portable electronic devices; f) panels for connecting the base panel and one or more display panels and for enclosing the tray. The panels enclosing the tray preferably hide from view the means for connecting the contacts to the battery recharging system and/or to the connection to the portable electronic device and the battery recharging system or a portion of the connection to the portable electronic device. The tray is adapted for use in a host system which supplies power to the tray or which transfers data between the portable electronic device and the system of the host. In a preferred embodiment, the host system is or is utilized in a vehicle.

In another embodiment, the invention is an assembly comprising a housing having space defined by at least two substantially parallel panels adapted for receiving a tray wherein the space has two grooves located in each of the substantially parallel panels wherein the grooves are disposed parallel to one another and host contacts capable of conducting electricity and/or transmitting data located in the assembly such that they can come into contact with contacts on the tray and a means for connecting the host contacts to a power source or an information using or generating system in the host; and a tray according to this invention wherein the base panel is slid into the grooves of the housing in a manner such that the contacts of the tray are in intimate contact with the host contacts under conditions such that electrical energy and/or data is capable of being conducted from the host to the battery recharging system or the connection for a portable electronic device.

The tray and assembly of the invention allows the charging and/or connection of a portable electronic system in or to a host, such as a vehicle, without the need for unique cords. The tray allows a user to view the display of one or more portable electronic devices in a convenient and safe manner. The tray and assembly of the invention allow the user to utilize portable electronic devices in a safer manner.

DETAILED DESCRIPTION

Figure 1:
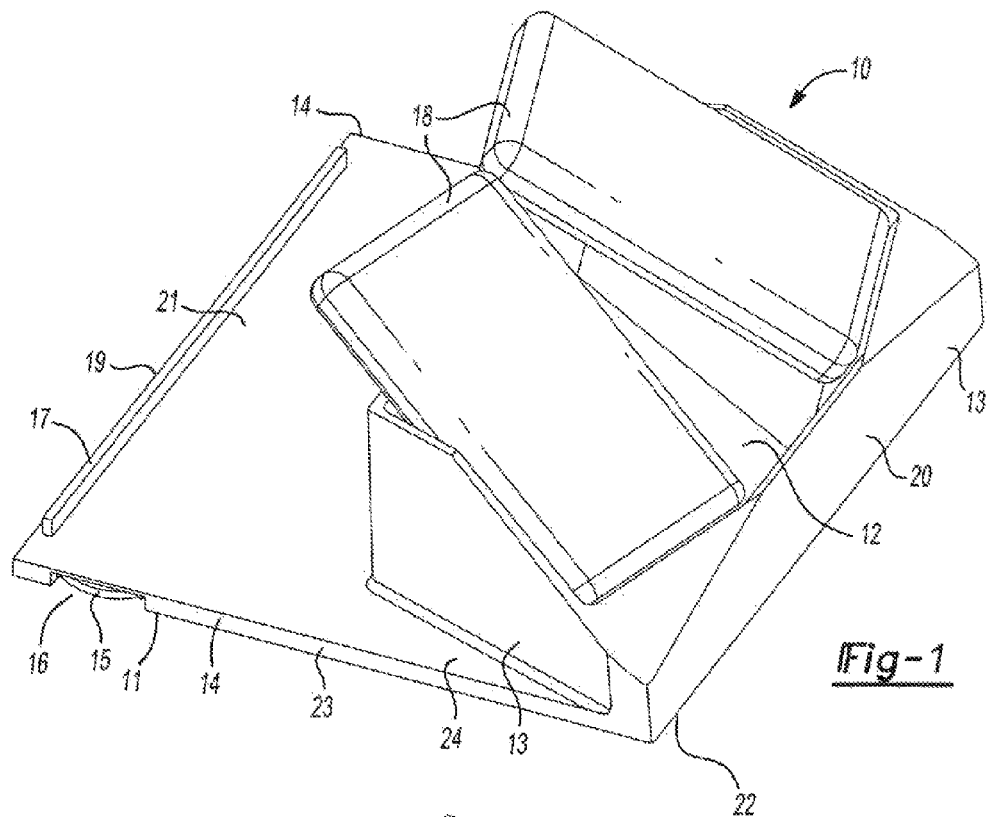
FIG. 1 is a view of the tray of the invention in use.

The invention relates to trays useful in recharging and connecting portable electronic devices to a host. Host as used herein means any system wherein a portable electronic device can be used or interacts to share information, including those locations where the trays and assemblies of the invention can be utilized in conjunction with a portable electronic device. Such hosts can be a vehicle or a system which uses or generates information, such as an entertainment system or a computer system. Preferably the host is a vehicle.

In one embodiment, the invention is a tray which is adapted to perform one or more of the following functions: recharge a portable electronic device either wirelessly or through a dedicated connection; store a portable electronic device; support the portable electronic device in a manner such that a display on the device is easily visible to a user; secure the portable electronic device in a desired location; eliminate the need for one or more charging cords or connection cords for portable electronic devices; facilitate the communication of a portable electronic device with a system that uses or generates data or information; and improve the safety of the use of a portable electronic device in a vehicle. A system that uses or generates information is any system that takes the input of information and data to generate an output or to adjust the performance of a system. Such systems include computer systems, including on board controllers found in vehicles; audio and video systems; navigation systems; wireless controllers adapted to remotely control systems, such as garage door openers, lights, access points of buildings, and the like.

The tray of the invention comprises a base panel which functions as a base upon which the tray is assembled. The base functions to support the rest of the tray and communicate with any system into which the tray is incorporated or will be incorporated. The base panel contains two edges that are on opposed sides of the base panel. The tray is arranged such that the opposed edges of the base panel form protrusions which can be adapted to slide into the grooves of an assembly adapted to hold the tray in place. In a preferred embodiment, the base panel is in the shape of a square or rectangle and more preferably is substantially flat. The base panel can comprise two parts, a bottom part to which internal components can be affixed, and a top part which is adapted to enclosed part of the internal components. In this embodiment, the top and bottom parts can be combined to form the base panel and enclose certain internal components, such as wires and control modules. The two parts of the base panel can be held together by any connection system which can hold the parts together during normal use. The connection system for holding the two parts together preferably include snap fits, screws, or a combination thereof. In a preferred embodiment, the two parts of the base panel are held together in a manner such that they can be separated to allow access to the internal parts to facilitate repair or replacement of internal parts. In a preferred embodiment, the bottom of the base panel, the side opposite of the side located internal to the tray, is adapted to serve as a tray when the bottom is placed facing up. More particularly, the tray can be placed in an assembly with the other parts facing down so that the bottom of the tray is facing up and the bottom of the tray can be used for storage of items including portable electronic devices when not in use. Parts of the tray which do not need to be visible to the user or which need to be protected in some manner from the environment can be mounted on the base panel along the side that is internal to the tray structure.

The tray further has one or more contacts adapted to facilitate contact of the tray with the electrical system or another system of the host. The contacts can be located at any location of the tray which allows them to come into contact with appropriate contacts of the host. The contacts on the tray can be in any form which allows transmission of electrical energy or system data between the host and the portable electronic device. In the embodiment wherein the contacts are electrical contacts, there are a pair of contacts. The contacts can be located on the tray in any location which allows the contacts to come into contact with the host electrical system, including on one or more of the back or the sides of the protrusions of the tray. A pair of contacts may be adapted to conduct electricity and/or data between a host and the portable electric device. In a preferred embodiment, the electrical contacts are located on the protrusions of the base panel wherein the electrical contacts are located such that when the tray is slid into grooves of an assembly the electrical contacts are in contact with electrical contacts in the grooves. The electrical contacts in the grooves are further connected to a source of power in the host. The contacts of the groove and the contacts of the tray cooperate to transmit electricity from the host to the tray and ultimately to the portable electronic device. The electricity can be used to run the portable electronic device or to charge the battery contained in the portable electronic device. The contacts located on the base can be any contacts which are capable of transmitting electricity and which can be arranged to protrude from the protrusions at the edge of the base panel. The contacts should protrude enough to contact the contacts in the groove of the assembly. Alternatively the electrical contacts can be located in indentations located on the base of the panel and the contacts of the host can protrude from the host in a manner to contact the electrical contacts in the tray. Preferably, the contacts are comprised of a conductive metal, such as copper. Preferably, the electrical contacts are metal strips which are attached to one or both of the sides or the back of the base panel. Preferably, the contacts are located on one or both of the protrusions on the base panel. Preferably, the metal strips are bent in a manner that the center of the strips protrude from the side of the base panel. In a preferred embodiment, the electrical contacts are located in depressions along the side of the protrusions in the base panel and are arranged such that a portion of the electrical contacts protrude from the edge of the base panel so as to allow them to come into contact with metal contacts located in grooves of the panels of assembly of the invention. In a preferred embodiment, the electrical contacts are located toward the rear of the base panel to allow the tray to be pulled out from the assembly and still remain in contact with the conductive metal contacts of the grooves of the assembly. In the embodiment wherein the contacts are adapted to connect the portable electronic device to a system of the host, the contacts can be arranged as described hereinbefore. Alternatively, the contacts can be either a plug or a plug receptacle which mates with a plug or plug receptacle in the host. In one embodiment, the tray can contain prongs on the back of the tray which mates with a plug in the host. Such prongs can be fixed to the back of the try or be at the end of a flexible wire system which is connected to the tray, preferably in the back.

The tray further comprises a battery recharging system or a connection for a portable electronic device adapted to connect the portable electronic device to the power system of the host, to communicate with an information using or generating system of the host, or both. A tray can contain both a battery recharging system and a connection for a portable electronic device. The battery recharging system can be any recharging system which functions to recharge the batteries of a portable electronic device. Such systems are known to the skilled artisan. In the embodiment wherein the tray contains a connection to the power system of the host, the battery of the portable electronic device will generally charge using the recharging system integrated into the portable electronic device. In a preferred embodiment, the battery recharging system uses an electromagnetic field to recharge a properly equipped portable electronic device. Examples of such recharging systems are available from Powermat and licensees of Fulton Innovation Inc. and include those systems disclosed in Baarman et. al. US Patent Publication 2008/0001572; Baarman et. al US Patent Publication 2009/0212637; Baarman et. al. US 2009/0106567; and Arai US Patent Publication 2008/0122297 and Azancot et. al. WO 2009/040807; all incorporated herein by reference. In a preferred embodiment, the battery recharging system comprises i) a control module connected to the connecting means; ii) a means for converting electrical energy of an electromagnetic field; iii) a second connecting means adapted to connect the control module with the means for converting electrical energy of an electromagnetic field; iv) a shield located between the control module and the means for converting electrical energy of an electromagnetic field; and v) a securing means for holding the means for converting electrical energy of an electromagnetic field on or near the non-visible side of the display panel. The control module functions to control the flow of electricity to the means for converting electricity to an electromagnetic field. Typically the control module is connected to the electrical contacts of the tray and to the means for converting electricity to an electromagnetic field. Typically, the control module contains a circuit board and/or a computer chip adapted to control the function of the battery recharging system. The control module is preferably located within the tray. It can be located in any place within the tray. Preferably, the control module is located on the base panel. In a preferred embodiment, the control module is affixed to the base panel. The control module may be affixed to the base panel to protect it from being damaged as a result of moving around within the tray. The battery recharging system contains a second connecting means adapted to connect the control module with the means for converting electrical energy of an electromagnetic field. Generally, the second connecting means can be any means which functions to conduct electricity and/or information between the control module and the means for converting electrical energy of an electromagnetic field. In a preferred embodiment it is two or more wires, a wire harness pigtail, and the like. Preferably, the second connecting means is a pair of wires which conduct electricity. The means for converting electricity to an electromagnetic field can be any means which converts electricity to an electromagnetic field wherein the electromagnetic field is capable of providing electricity to a properly equipped portable electronic device capable of converting the electromagnetic energy to electricity to charge the battery of the portable electronic device. In a preferred embodiment, the means for converting electrical energy of an electromagnetic field comprises a circular coil of conductive wire. Such coil of wire is preferably located near or adjacent to the inside surface (non-visible surface) of the display panel. The circumference, thickness of the wires and the number of wires in the coil are selected in a manner such that the desired electromagnetic field is produced when connected to a source of electricity. The battery recharging system further comprises a securing means for holding the means for converting electrical energy of an electromagnetic field on or near the non-visible side of the display panel. Such securing means can comprise any method of securing the means for converting electrical energy of an electromagnetic field in the desired location. Such securing means can comprise a panel affixed to the inside of the display panel, springs, elastic bands, one or more armatures, wherein if there are more than one they are interconnected and the like. Such securing means can be arranged to allow the recharging means to move in the x and y direction parallel to the display panel, as disclosed in copending commonly owned patent application filed concurrently herewith titled "Movable Magnet and Panel Assembly" Serial Number claiming priority from U.S. Provisional Application Ser. No. 61/290,348 filed Dec. 28, 2009. In the embodiment wherein the securing means is one or more armatures, such armatures can be arranged as described below. The armatures are rotatably attached to a bridge component and the bridge component is attached to a panel of the tray. The means for converting electrical energy of an electromagnetic field is secured to the end of the lower arm. This configuration allows for the movement of the means for converting electrical energy of an electromagnetic field almost anywhere (x and y movement) within the span of the interconnected armatures, when the means for converting electrical energy of an electromagnetic is subjected to a tangential force. It is also contemplated that the armatures may include geometric features (e.g. tabs, projections, or the like) that may function to limit the relative movement of a given armature (e.g. to less than 360 degrees rotation). In a preferred embodiment, the means for converting electrical energy of an electromagnetic field is located substantially parallel to the plane of the display panel. The securing means can be free floating or can be fixed in place once the securing means is located in the desired location. The means for fixing the securing means in place are well known to the skilled artisan. The shield located between the control module and the means for converting electrical energy of an electromagnetic field functions to shield the control module from the electromagnetic field generated by the means for converting electrical energy to an electromagnetic field. The electromagnetic field can interfere in the function of the control module. The shield is located between the control module and the means for converting electrical energy of an electromagnetic field. The shield can be located adjacent to the control module or the means for converting electrical energy of an electromagnetic field. The shield can be fabricated from any material that does not allow electromagnetic radiation to pass through the shield or allows only an amount of electromagnetic radiation to pass through the shield that does not interfere in the functioning of the control module. The shield can be fabricated from iron containing materials, such as steel, and the like. In one embodiment where the means for holding the means for converting electrical energy of an electromagnetic field on or near the non-visible side of the display panel is fabricated from a material that does not transmit electromagnetic or insignificant amounts of electromagnetic radiation (that amount which does not interfere in the functioning of the control module) such means can also serve as the shield. The shield can be of a size such that the control module is protected from electromagnetic radiation. In a preferred embodiment, the shield is affixed to the control module between the control module and the means for holding the means for converting electrical energy of an electromagnetic field near the display panel.

The tray further comprises one or more display panels adapted such that one or more portable electronic devices can rest on the display panel. In a preferred embodiment, the display panel is arranged so as to allow one or more users of the one or more electronic devices to access the electronic devices easily and to see any displays integrated into the portable electronic devices. The display panel can have more than one surface, each surface being disposed in different planes. When the display panel has more than one surface disposed in different planes the relative location of the surfaces is chosen to allow the displays on the portable electronic devices to be seen by more than one user at one time. In the embodiment wherein the host is a vehicle, the different surfaces may be arranged to allow different occupants in the vehicle in different locations to see different displays of different portable electronic devices. The entire display panel or a portion of the display panel may be moveable into different locations to allow the users to adjust the direction from which one or more displays on one or more portable electronic devices may be viewed. The moveable portion of the display panel may have a variety of fixed locations. The locations may be fixed by any known means for fixing a movable part in place such as slots, projections, detents and the like. In one embodiment, a part of the display panel can be rotatable on an axis, and the like. In the embodiment, wherein the display rotates about an axis, the display panel and the panels attached to the display panel can create pivot points where they meet so as to allow the display panel to rotate. A rod can be disposed in the display panel which projects from each end of the display panel and seats in hole in the adjacent panels to hold the display panel in place and allow it to rotate around the axis created by the rod. Alternatively the display panel and adjacent panels can have projections and seats for the projections that seat the display panel and allow it to rotate about an axis created. The tray of the invention may further comprise a means of holding the one or more portable electronic devices in place on the display panel. Such means can be any mechanical means of holding the portable electronic device in place including clips, elastic bands, spring loaded blocks, magnets strategically located, Velcro™ strips and the like. In one embodiment, the portable electronic device is held in place by means of a magnet located adjacent to or near the inside or non-visible surface of the display panel. In this embodiment, the portable electronic device contains a magnet or a metal part adapted to cooperate with the magnet located in the tray to hold the device in place. In the embodiment wherein the tray comprises a wire coil adapted to generate an electromagnetic field, a magnet can be located in the center of the coil. Properly equipped portable electronic devices also contain a magnet or a metal part attracted to magnets. These properly equipped portable electronic devices are adapted to be attracted to the magnet located in the coil. By lining up the magnet or metal part of the portable electronic device with the magnet located in the coil the portable electronic device is properly aligned to such that the portable electronic device can be recharged, assuming it has the necessary equipment to convert the electromagnetic field to electricity to charge the battery of the portable electronic device. Alternatively, the tray may comprise a moveable magnet system adapted to allow the magnet to articulate in the x and y axis substantially parallel to the display panel as described and claimed in commonly owned patent application titled "Moveable Magnet and Panel Assembly" filed concurrently herewith, serial number claiming priority from U.S. Provisional Application 61/290,348, filed on Dec. 28, 2009, and incorporated herein by reference. The display panels may have a ledge affixed to the bottom of the display panel adapted to hold the portable electronic devices on the display panel. Preferably, the ledge is a panel which is disposed in a plane perpendicular to one or more of the surfaces of the display panel. In a preferred embodiment the angle of the plane of the display panel in relation to the plane of the base panel is less than 90 degrees and wherein the display panel is disposed such that the rechargeable portable electronic device can rest on the display in a manner that an user of a host system, such as the driver of a vehicle, can easily see a display on the portable electronic device. In another embodiment the ledge can be further attached to a short panel parallel to and opposing the display panel and separated from the display panel by the ledge. This short panel is adapted to aid in holding the portable electronic device in place. In another embodiment, wherein the display panel has a ledge and opposing short panel the display panel may further comprise a spring loaded block which is seated in the display panel and which projects from the display panel. The spring loaded block functions to hold a portable electronic device in the tray created by the display panel, the ledge and opposing short panel. The block engages the portable electronic device, holds it between the display panel and the short opposing panel and the spring provides enough tension to hold the portable electronic device on or in the display panel.

The tray of the invention can contain one or more connections adapted to connect one or more portable electronic devices to the host. This is particularly advantageous where the host is a vehicle. The connections can be adapted to allow the portable device to connect directly to the power supply of the host, to exchange information or data with a system of the host which uses or generates information. The connection can be any know connection used with portable electronic devices. Due to the variety of connection systems presently utilized with portable electronic devices, the connection may need to be specific to the particular portable electronic device. It is contemplated that manufacturers of devices or accessories for such devices may provide trays with connections specifically adapted for use with particular devices. Examples of such connections include Apple IPOD™ jacks, satellite radio jack, and the like. In another embodiment, a standard connection which is used in a variety of devices may be used for the tray. Such standard connections include USB connection ports, standardized power jacks for cell phones, mini USB ports, and the like. In one embodiment the connection may include a docking jack which communicates with the power supply system of the host, such as the power supply system of the vehicle.

The tray further comprises one or more panels for connecting the base panel to the display panel. Such connecting panels function to provide the remainder or the structure needed to enclose the tray. The connection panels function, in conjunction with the base panel and display panel, to define the structure of the tray and to protect the parts of the tray located inside of the tray. The base panel, display panel and the connecting panels may be connected by any method of connection which maintains the desired structure and shape of the tray and the panels in relation to one another. The panels may be molded in place, held together by adhesives or mechanical fasteners or any combination thereof. The panels may be manufactured from any material which does not interfere in the function of the trays or assemblies in which the trays are incorporated. Preferably the trays are manufactured from plastic material. Any material which can withstand the use environment and provide the needed structural integrity may be utilized. Preferred plastic material includes toughened polyolefins (preferably polypropylene and more preferably elastomer modified polypropylene) or blends of polycarbonate and acrylonitrile-butadiene-styrene terpolymers (PC/ABS).

In another embodiment, the tray can comprise a module adapted to function as a data exchange system. A data exchange system is a system for transferring data or information between different systems which generate or use data or information. The data exchange module can be directly connected to the portable electronic device through a connection as described hereinbefore or can be connected wirelessly. In the embodiment wherein the data exchange module is connected wirelessly to the portable electronic device, the module can be located in the internal part of the tray. The data exchange module can communicate wirelessly with other information generation of using systems of the host. Alternatively, the data exchange module can have a direct connection to the host. In the embodiment wherein the host is a vehicle, the data exchange module can be directly connected to the wire harness of the vehicle or connected by pigtail, RCA cable, a USB wire, firewire, HDMI cable, and the like. Where the data exchange module communicates wirelessly with the portable electronic device and other information generating or using systems, any known wireless data communication system may be utilized including blue tooth systems, "RF (radio frequency) systems, WIFI system, and the like.

In another embodiment, the invention is an assembly including the tray of the invention. Such assembly comprises a housing having space defined by at least two substantially parallel panels adapted for receiving a tray wherein the space has two grooves located in each of the substantially parallel panels wherein the grooves are disposed parallel to one another and metal contacts capable of conducting electricity are located in the grooves and a means for connecting the metal contacts to a power source; and a tray according to the invention wherein the base panel of the tray can be placed into the grooves of the housing in a manner such that the electrical contacts of the tray are in intimate contact with the metal contacts of the grooves of the panels under conditions such that electrical energy is capable of being conducted from a power source through the two sets of contacts to the battery recharging system or the connection for a portable electronic device. The assembly can be adapted for use in any host system as described hereinbefore. The assembly can be an entertainment system, a computer system, or a component thereof. Where the host is a vehicle, the assembly can be an instrument panel, a floor mounted counsel, a seat structure, or an overhead mounted console. The overhead mounted counsel can be integrated into the headliner of a vehicle. The assembly includes panels which have at least one point wherein the panels have grooves which are substantially parallel to one another and are adapted to receive and hold the protrusions on the base panel of the tray. The grooves are robust enough to hold the tray in place during normal use of the assembly and the host. In the embodiment where the host is a vehicle, the grooves and panels need to be robust enough to hold the tray in place during travel. In the grooves are metal contacts which are connected to a power source and are capable of transmitting power to the electrical contacts on the tray. Any electrical contacts which transmit electricity to matching contacts on the tray and which can be located in a groove may be used in this invention. Preferably the metal contacts in the groove comprise metal strips disposed along the entire length of the grooves so as to allow the tray to be placed in various positions with respect to the assembly. Preferably, the metal contacts in the groove are contacted with the power source at all times allowing the electrical system of the tray to receive electricity on demand when in contact with the grooves of the assembly.

The tray preferably contains one or more locators on the base panel adapted to hold the tray in a predetermined location within the grooves of the assembly. These locators are used to hold the tray in certain locations during use. Preferably, the assembly has, in or near the grooves location, holders that in cooperation with the locators of the tray hold the tray in a predetermined location in the assembly. The locators can take any form which performs the desired function of holding the tray in a predetermined location in the assembly. Preferably, the locators include ridges formed in or attached to the base panel, channel sets located at various places in the assembly, projections in the assembly, locking features (detents or stops) in the assembly, and the like. These locators can be located on the edge, top or bottom of the base panel provided they are capable of cooperating with the location holders of the assembly. The location holders of the assembly can be in any form as long as the function of cooperating with the locators of the tray to hold the tray in place is achieved. In a preferred embodiment, the locators are located on the top and bottom of the rear of the base panel. Locating them on both the top and the bottom allows the tray to be held in place in the orientation wherein the display tray is upright and in use and where the display panel is oriented down and is not in use. Where the display panel is located in the down position, the tray can be used for temporary storage or to hold items which a user desires to have ready access to.

The tray may be attached to one or more arms. The arm may be connected to a device that allows the arm to move the tray. Preferably, the arm is connected to a track (i.e. a link track). The track and arm may be long enough so that the tray extends out into the user area and the user can move and use the tray. Preferably, the track may allow the arm to extend about 50 mm or more into the user area, more preferably about 75 mm or more into the user area, or even more preferably about 100 mm or more into the user area and most preferably about 110 mm or more. The arm may extend and support the tray in any manner. Preferably, the arm may support the tray in a cantilever fashion.

The arm may include one or more devices that allow the tray, the arm, or both to rotate. The arm may include one or more rotational links. Preferably, the arm will include two rotational links. The first rotational link may be located at a first end of the arm, and the second rotational link at a second end of the arm. However, a rotational link may be located in the center of the arm. The first rotational link may be located on or near the track. The first rotational link may allow the arm to rotate the tray in any direction. The first rotational link may allow the arm to be moved side to side. The first rotational link may allow the arm to be moved up and down. The second rotational link may allow the tray to rotate in any direction. The second rotational link may allow the tray to move side to side. The second rotational link allows the tray to move up and down. Both the first and second rotational link may include a feature that allows the tray to be locked in a rotated position so that the tray becomes immobile or locked. The rotational links may be capable of rotating any angle. Preferably, the rotational links will rotate about 10 degrees or more, more preferably about 20 degrees or more, or even more preferably about 25 degrees or more. Preferably, the rotational links will rotate about 90 degrees or less, more preferably about 60 degrees or less, and even more preferably about 45 degrees or less (e.g. about 30 degrees).

The track may include a lock out feature so that the when the tray is extended the tray does not slide. The lock out feature may lock the tray when the tray is not in the storage position. The lock out feature may lock the tray when the either of the rotational links are rotated so that the tray cannot be moved until the tray is rotated into the storage position.

The tray may be stored when the tray is not in use. The tray may be housed inside of a vehicle component. Preferably, the tray is stored inside of a vehicle console, dashboard, or the like. The vehicle housing may include a cover or door. The cover may be integrated into the tray so that when the tray is in the stored position the front of the tray has the same appearance as the vehicle component that the tray is stored. The door may be separate from the tray. The door may be any type of door capable of concealing the tray. The door may be a tambour door, a flip up door, a sliding door, or the like. It is contemplated that the track, arm, rotational links, lock, or a combination thereof may be used with any of the other embodiments disclosed herein.

The trays and assemblies of the invention can be used with any portable electronic device which can be recharged, needs electricity to function or which can be connected to other information generating or using systems of a host. Examples of such portable electronic devices include cell phones, personal data assistants, portable entertainment devices such as Apple's IPOD™ portable entertainment devices and Zune™ portable entertainment devices, portable navigation systems, and radar detectors. In this application properly equipped portable electronic devices are referenced. Properly equipped portable electronic devices refer to such devices which have the necessary equipment to work with the trays of the invention. The tray and the portable electronic devices need to be matched as to functionality. For instance if the portable electronic device requires a connection to the host, appropriate matching connections are required in the portable electronic device and in the tray. If the portable electronic devices is an IPOD™ personal entertainment system, the tray needs to have a docking jack which fits the IPOD™ personal entertainment system. In another embodiment, wherein the tray contains a wireless battery recharging system, the portable electronic device requires matching equipment adapted to convert the electromagnetic field into a form of electricity capable of recharging the battery. In the embodiment wherein the tray contains a coil of wire with generates an electromagnetic field, the portable electronic device may include another wire coil capable of translating the electromagnetic field from the coil located in the tray to electricity capable of recharging the battery of the portable electronic device. In use the portable electronic device needs to be located in the proper position such that the two wire coils can function to transfer energy. In a preferred embodiment both coils have a magnet located in the center of the coils, this allows a user to align the coil of the portable electronic devices with the coil of the tray. The user can move the portable electronic device about on the tray until the magnets align. Generally, the user can feel when they are aligned.

The following description of the figures is provided to aid in an understanding of the claimed invention. The description is not meant to limit the scope of the claims to which the inventors are entitled. FIG. 1 shows an embodiment of a tray (10) of the invention from the outside of the tray with portable electronic devices (18) resting on the display panel (12). Shown is a tray (10) having a base panel (11), a display panel (12) and connecting panels (13) wherein the panels (11) (12) and (13) provide an integrated shell for the tray (10). The base panel (11) comprises a bottom part (23) of the base panel (11) and a top part (24) of the base panel (11) and has at opposing sides parallel protrusions (14) which are adapted to slide into grooves of an assembly (not shown). The tray has electrical contacts (15) protruding from an opening (16) on the side of the base panel (11) located along the protrusions (14) in the base panel (11). A locator (17) is a ridge located on the top surface (21) of the top part (24) of base panel (11) at the rear of the tray (19). The tray (10) has a front (20) and a bottom 22 (not actually shown).

Figure 2:
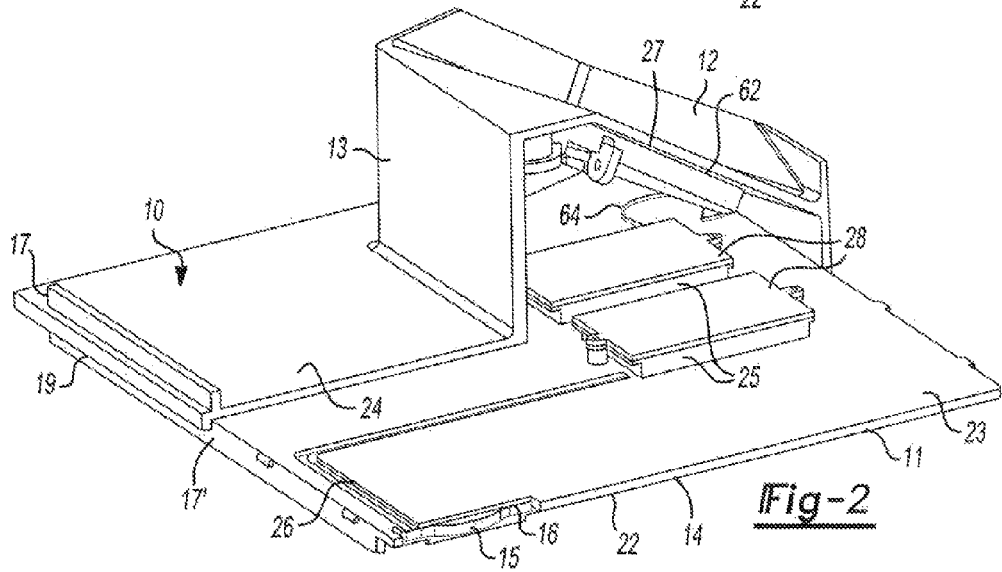
FIG. 2 is a cut away view of the tray illustrating some of the internal components of the tray.

FIG. 2 illustrates a tray (10) of the invention having a base panel (11), a display panel (12) and connecting panels (13) which are partially cut away to illustrate some of the internal parts of the tray (10). Also illustrated are the protrusions of the base panel (14), an electrical contact (15) located in an opening (16) of the edge of the base panel (11) which is part of the protrusion (14) of the base panel (11). Also illustrated is the locator (17) on the rear of the tray (19). A locator (17') is shown on the bottom (22) of the base panel (11). Shown is a complete bottom part of the base panel (23) and only part of the top part of the base panel (24). This embodiment shows that the top part of the base panel (24) and the bottom part of the base panel (23) partially encloses some of the internal parts of the tray. The internal parts visible include some parts of a battery recharging system (62) including the control modules (25) which are connected to the electrical contacts (15) by wires (26). Also shown adjacent to the display panel (12) is an electric coil (27) adapted to generate an electromagnetic field. Located between the control modules (25) and the electric coil (27) are two shields (28) adapted to protect the control modules (25) from the electromagnetic field generated the electric coil (27).

Figure 3:
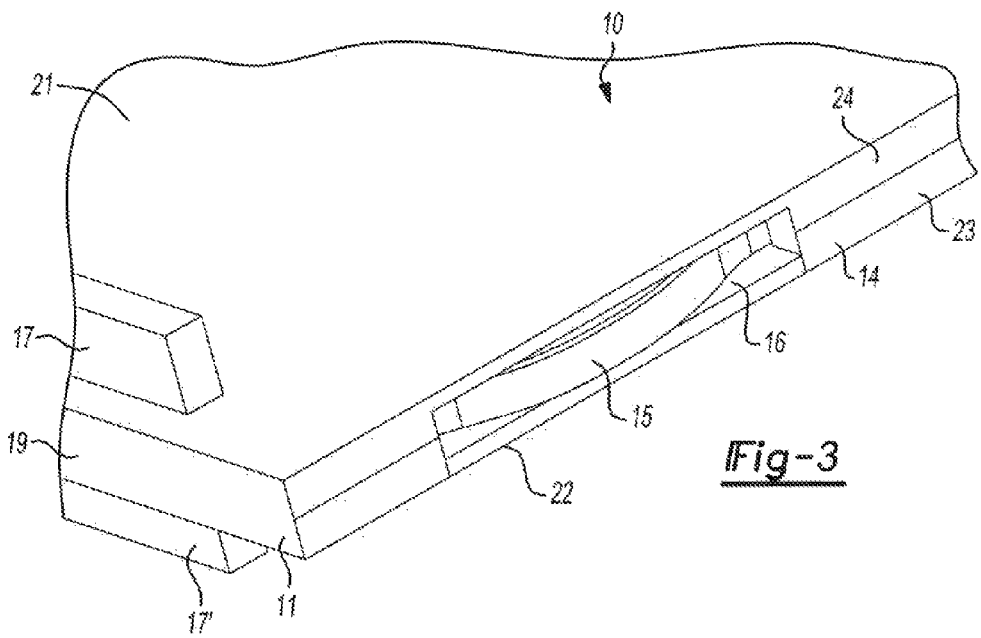
FIG. 3 is a close up view of a protrusion of the tray of the invention and the electrical contacts of the tray.

FIG. 3 is a close up of the electric contacts (15) located near the rear (19) of a tray (10) of the invention. Shown is the base panel (11) having a top part (24) and a bottom part (23). The portion shown includes part of a protrusion (14) from the base panel (11) and an opening (16) in the base panel (11) along the protrusion (14) wherein an electrical contact (15) comprising a conductive metal strip protrudes from the opening (16). Also shown is the top of the tray (21). A locator (17) is shown on the top of the tray (21) near the rear of the tray (19). A locator (17') is shown on the bottom of the tray 22 near the rear of the tray (19).

Figure 4:
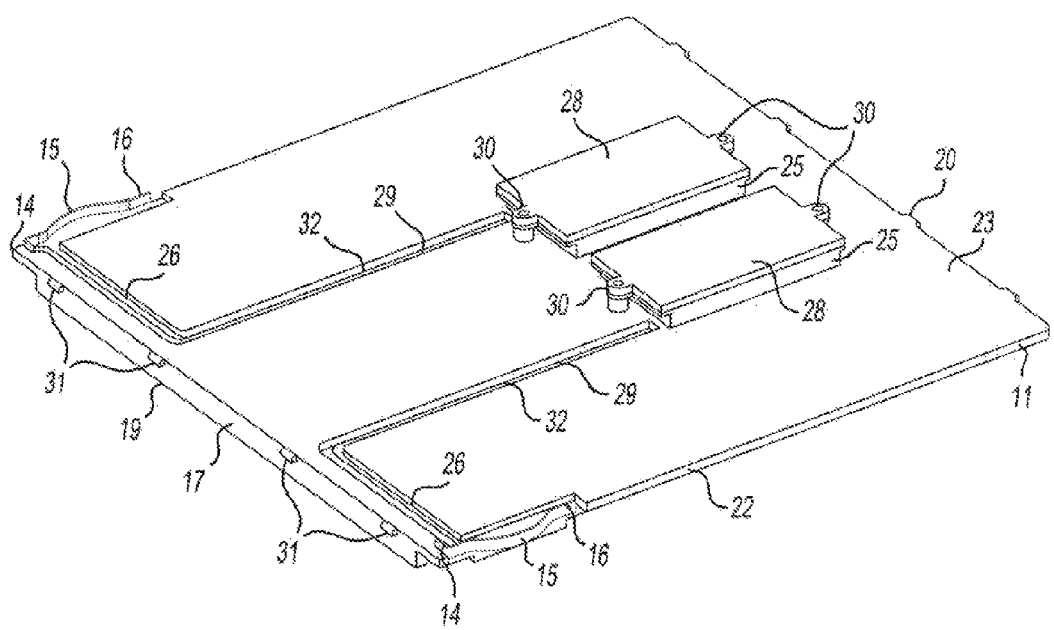
FIG. 4 is a view of the bottom part of the base panel showing internal components located on the bottom part of the base panel.

FIG. 4 shows the bottom part (23) of the base panel (11). Two parallel partial protrusions (14) at opposite sides of the bottom part (23) of the base panel (11) are shown. Two openings (16) having two conductive metal strips which are electrical contacts (15) are located on the protrusions (14) at the rear (19) of the tray (10). The electric contacts (15) are connected by wires (26) to the control modules (25). Shown on bottom of the lower part (23) of the base panel (11) at the rear of the tray (19) is a ridge which functions as a locator (17). On top of the control modules (25) are shields (28). The shields (28) and control modules (25) are affixed to the bottom of the base panel (23) by screws or snap fits (30) located at each end. The wires (26) are located in channels (wire valley) (31) and held in place by snap fits (29). Snap fits (31) along the bottom panel (23) are shown. These snap fits (31) are adapted to mate with parts of the top part of the base panel (24), not shown, to hold the two parts of the base panel (11) together.

Figure 5:
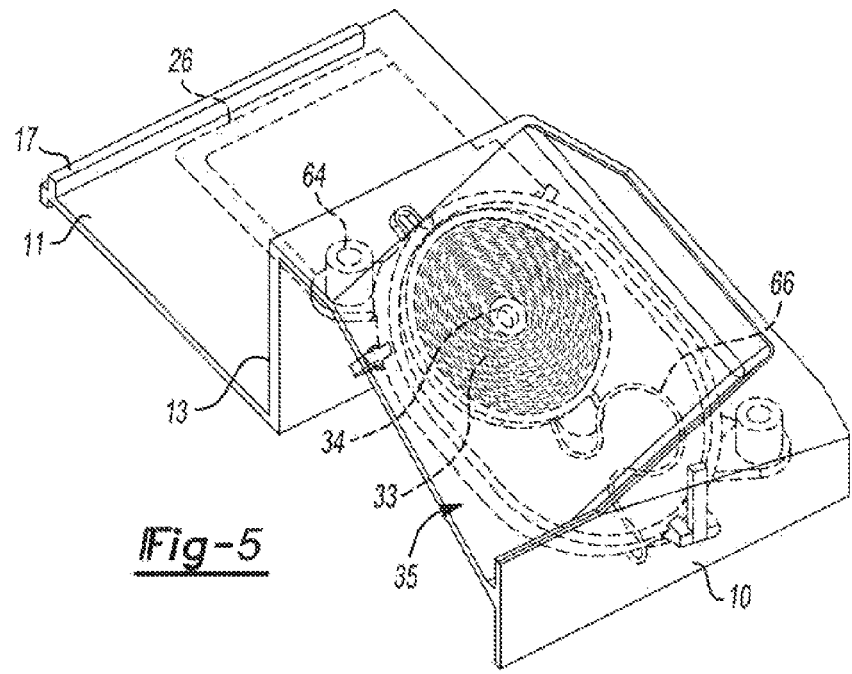
FIG. 5 is a view of a tray of the invention showing the internal battery charger.

FIG. 5 is a view of a tray (10) of the invention wherein the display panel (12) and the top part (24) of the base panel (11) are invisible. Visible is a coil of wire (33) adapted to generate an electromagnetic field. Located inside of the coil of wire (33) is a magnet (34) adapted to aid in alignment of a battery charger of a portable electronic device (18) (not shown) with the electric coil (33). Further illustrated is a means for holding (64) the electric coil near or adjacent to the display panel (35). Also shown are the electric wires (26), connecting panels (13), the bottom portion (23) of the base panel (11), and a locator (17). Also shown are wires (66) connecting the control module (25) to the coil of wire (33).

Figure 6:
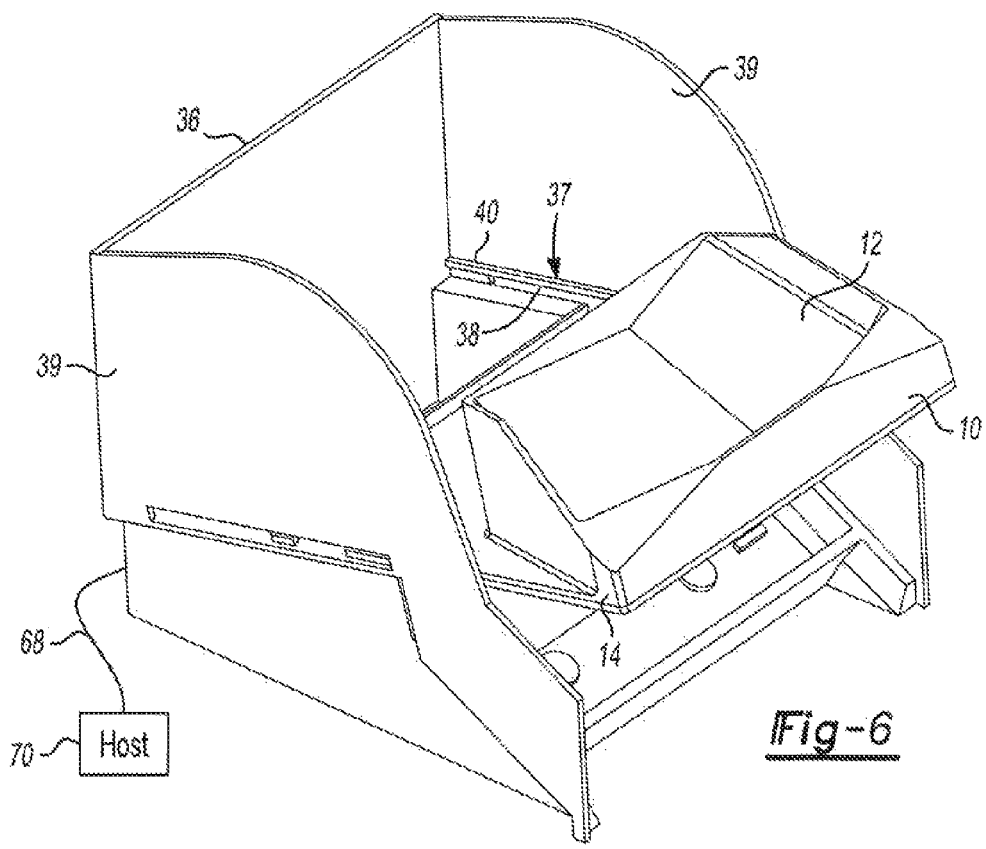
FIG. 6 is a view of an assembly of the invention with the tray in the upright position.

FIG. 6 is a view of an assembly of the invention having a housing (36) with the tray (10) in the upright position. FIG. 6 shows a tray (10) slid into the grooves (37) of a housing comprising (36). The display panel (12) is disposed up. The protrusions (14) are partially slid into the grooves (37). The grooves (37) have located therein a conductive metal strip (38) adapted to conduct electricity to the tray (10). The housing (36) shows opposing panels (39) having in the grooves (37) located therein. FIG. 6 also shows a wire (68) connecting the assembly (36) with a host (70) capable of providing power or capable of using or generating and sharing information with a portable electronic device (18) on the tray (10) located in the assembly (36).

Figure 7:
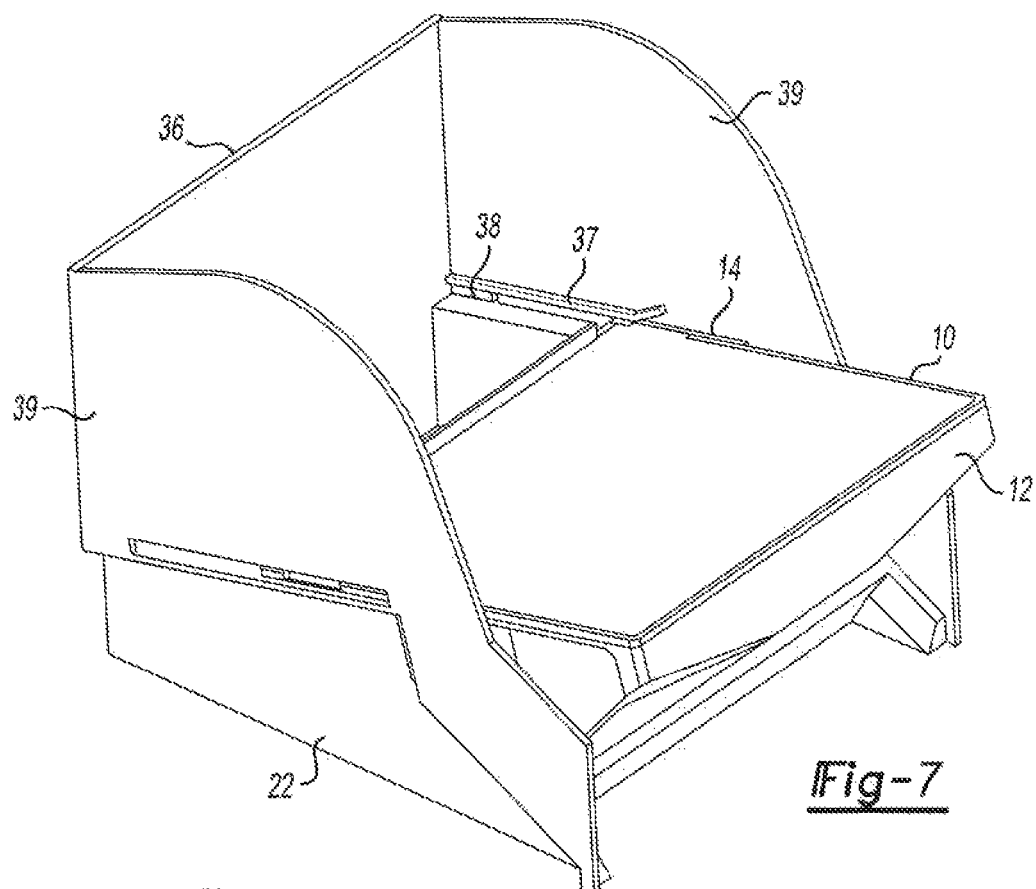
FIG. 7 is a view of an assembly of the invention with the display panel down.

FIG. 7 is a view of an assembly of the invention with the display panel (12) down. FIG. 6 shows a tray (10) slid into the grooves (37) of a housing (36). The display panel (12) is disposed down. The protrusions (14) are partially slid into the grooves (37). The bottom of the tray (22) is disposed up and is useful as a utility tray. The grooves (37) have located therein a conductive metal strip (38) adapted to conduct electricity to the tray (10). The housing (36) shows opposing panels (39) having located therein grooves (37).

Figure 8:
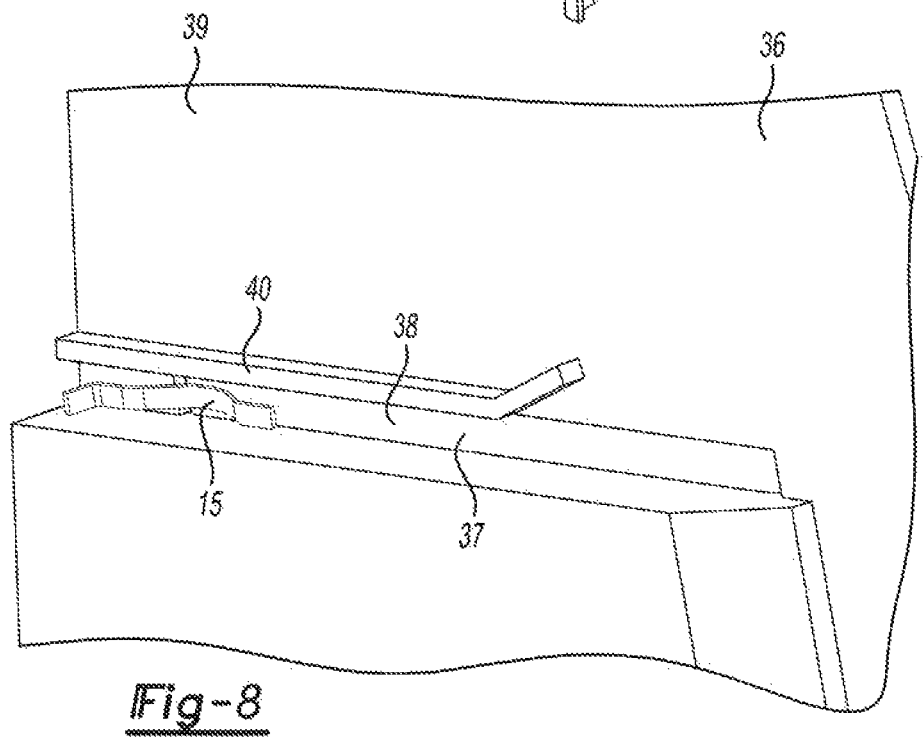
FIG. 8 is a view of one panel of the housing into which a tray of the invention can be places showing the groove and metal contact.

FIG. 8 is a view of one panel of the housing (36) into which a tray of the invention can be placed showing the groove (37) and metal contact (38). Shown are grooves (37) having a metal strip (38) disposed therein. Also shown are guides (40) adapted to lead the tray into the proper location as it is inserted into the grooves. Also shown is an electrical contact (15), separate from the tray (10), in contact with the conductive metal strip (38) located in the grooves (37) of an opposing panel (39) of the housing (36).

Figure 9:
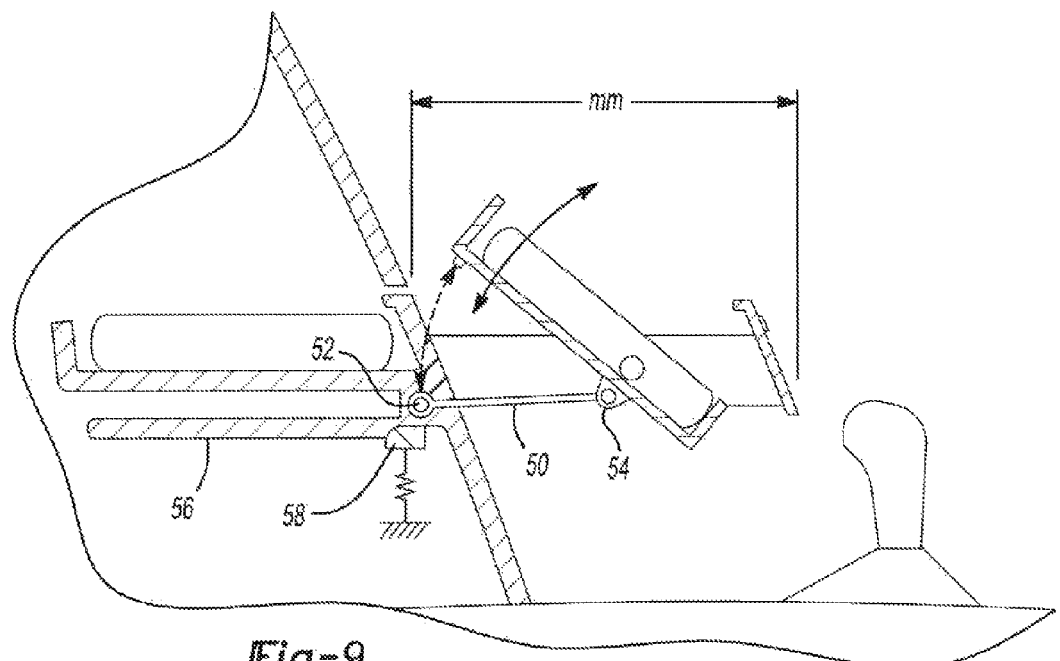
FIGS. 9 and 10 is a view illustrating the tray and another mounting mechanism.
Figure 10:
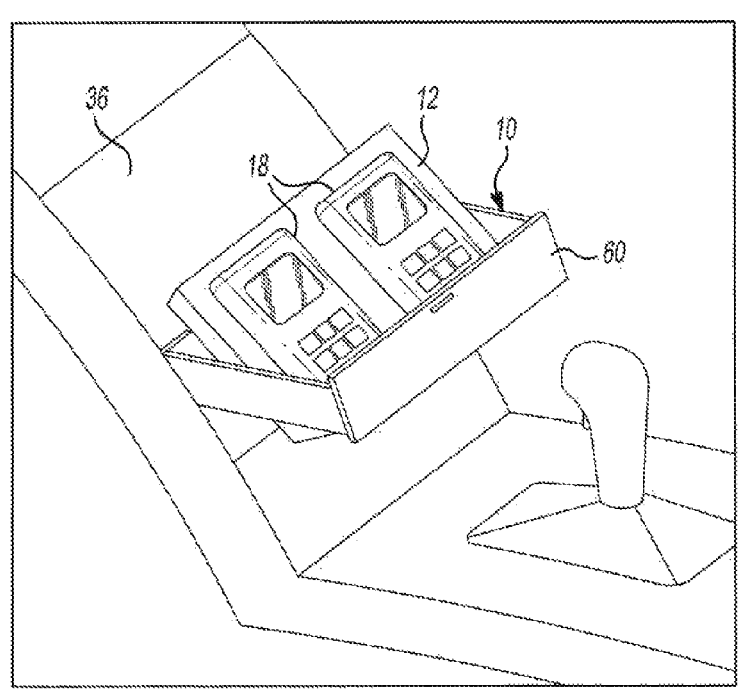

FIGS. 9 and 10 are views of the tray extended into the user area. The tray (10) is attached to an arm (50). The arm includes a first rotational link (52) and a second rotational link (54). The track (56) is shown with a lock (58). The tray as illustrated in FIG. 9 is shown both extended into the user space and in the stored position. FIG. 9 also shows rotational movement of the rotational links. FIG. 10 shows the tray (10) extended from a console (housing (36)) in an automobile (host). Shown are portable electronic devices (18) disposed on a display panel (12) having a ledge or panel (60) adapted to hold the portable electronic devices (18) in place on the display panel (12) or the tray (10).

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

What is claimed is:

1. A tray comprising:
   a) a base panel having two opposite edges adapted for sliding within grooves of a structure;
   b) a pair of contacts adapted to conduct electricity and/or data between a host and a portable electronic device;
   c) a battery recharging system adapted to provide one or more electromagnetic fields capable of transferring an electrical charge to properly equipped portable electronic device having a rechargeable battery or a connection for the portable electronic device adapted to connect the portable device to the power of a host system, other electronics of the host, or both;
   d) a first connecting means for connecting the contacts to the battery recharging system or to the connection of the portable electronic device;
   e) one or more display panels providing a surface for resting one or more portable electric devices upon, such panels adapted to allow one or more users of portable electronic device to view one or more displays of the portable electronic devices;
   f) panels for connecting the base panel and one or more display panels and for enclosing the tray;
   g) a means for locating the rechargeable portable electric device in a desired location.

2. A tray according to claim 1 wherein the host is a vehicle.

3. A tray according to claim 2 wherein the one or more display panels are adapted to allow one or more occupants of the vehicle to view a display of a rechargeable portable device resting on the display panel.

4. A tray according to claim 1 which further comprises a ledge located at the bottom of the display panel adapted to hold one or more portable electric devices.

5. A tray according to claim 1 wherein the locating means is a magnet located on or near the non-visible side of the display panel.

6. A tray according to claim 1 herein the battery recharging system comprises i) a control module connected to the first connecting means; ii) a means for converting electrical energy of an electromagnetic field; iii) a second connecting means adapted to connect the control module with the means for converting electrical energy of an electromagnetic field; iv) a shield located between the control module and the means for converting electrical energy of an electromagnetic field; and v) a securing means for holding the means for converting electrical energy of an electromagnetic field on or near the non-visible side of the display panel.

7. A tray according to claim 6 wherein the control module is located on the base panel and the shield is located on top of the control module between the control module and the means for converting electrical energy of an electromagnetic field.

8. A tray according to claim 6 wherein ii) the means for converting electrical energy of an electromagnetic field comprises a circular coil of conductive wire and a locating means comprising a magnet is within the circular col of conductive wire.

9. A tray according to claim 1 further comprising a data exchange system adapted to communicate with the portable electronic device and with other information systems of a vehicle.

10. A tray according to claim 9 wherein the data exchange system communicates wirelessly with the portable electronic device.

11. A tray according to claim 9 wherein the data exchange system communicates with the portable electronic device by means of a direct connection to the portable electronic device.

12. A tray according claim 1 wherein the display panel or a portion of the display panel is moveable to allow a display on the portable electronic device to be viewable from different vantage points.

13. A tray according to claim 1 wherein the tray further comprises an information transmission system adapted to transfer information between the portable electronic device and a system in the host that uses or generates information.

14. A tray according to claim 1 wherein the tray is attached by an arm.

15. A tray according to claim 14 wherein the tray includes one or more rotational links.

16. A tray according to claim 14 wherein the tray includes a lock out.

17. An assembly comprising a housing having space defined by at least two substantially parallel panels adapted for receiving a tray wherein the space has two grooves located in each of the substantially parallel panels wherein the grooves are disposed parallel to one another and host contacts capable of conducting electricity and/or transmitting data are located in the assembly such that they can come into contact with contacts on the tray and a means for connecting the host contacts to a power source or an information using or generating system in the host; and a tray according to claim 5 wherein the base panel is slid into the grooves of the housing in a manner such that the contacts of the tray are in intimate contact with the host contacts of the grooves under conditions such that electrical energy and/or data is capable of being conducted from the host to the battery recharging system or the connection for a portable electronic device.

18. An assembly according to claim 17 wherein the housing is integrated into a vehicle.

19. An assembly according to claim 17 wherein the housing is integrated into a vehicle instrument panel or a vehicle console.

* * * * *

UNITED STATES PATENT AND TRADEMARK OFFICE
CERTIFICATE OF CORRECTION

PATENT NO. : 8,624,547 B2  Page 1 of 1
APPLICATION NO. : 12/970205
DATED : January 7, 2014
INVENTOR(S) : Thorsell et al.

It is certified that error appears in the above-identified patent and that said Letters Patent is hereby corrected as shown below:

In the Claims

Column 14

Line 43, delete "herein the battery" and insert --wherein the battery--

Line 62, delete "circular col" and insert --circular coil--

Signed and Sealed this
Thirteenth Day of May, 2014

Michelle K. Lee
*Deputy Director of the United States Patent and Trademark Office*